(12) United States Patent
Makl, Jr.

(10) Patent No.: US 6,477,032 B2
(45) Date of Patent: Nov. 5, 2002

(54) LOW INDUCTANCE CHIP WITH CENTER VIA CONTACT

(75) Inventor: Albert S. Makl, Jr., Chula Vista, CA (US)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 09/775,050

(22) Filed: Jan. 31, 2001

(65) Prior Publication Data

US 2002/0101702 A1 Aug. 1, 2002

(51) Int. Cl.[7] .............................................. H01G 4/228
(52) U.S. Cl. .............................. 361/306.3; 361/321.2; 361/329
(58) Field of Search .............................. 361/301.4, 302, 361/303, 306.1, 306.2, 306.3, 309, 321.2, 328, 329, 298.2

(56) References Cited

U.S. PATENT DOCUMENTS

| | | | | |
|---|---|---|---|---|
| 3,177,415 A | * | 4/1965 | Kater | |
| 3,426,257 A | * | 2/1969 | Youngquist | |
| 4,148,003 A | * | 4/1979 | Colburn et al. | |
| 4,247,881 A | * | 1/1981 | Coleman | 361/302 |
| 4,349,862 A | * | 9/1982 | Bajorek et al. | |
| 4,419,714 A | * | 12/1983 | Locke | |
| 4,430,690 A | * | 2/1984 | Chance et al. | |
| 4,439,813 A | * | 3/1984 | Dougherty et al. | |
| 4,706,162 A | * | 11/1987 | Hernandez et al. | |
| 4,831,494 A | * | 5/1989 | Arnold et al. | |
| 5,153,540 A | * | 10/1992 | Gliha, Jr. | |
| 5,177,663 A | * | 1/1993 | Ingleson et al. | |
| 5,272,590 A | * | 12/1993 | Hernandez | |
| 5,287,076 A | * | 2/1994 | Johnescu et al. | |
| 5,905,627 A | * | 5/1999 | Brendel et al. | |

* cited by examiner

Primary Examiner—Anthony Dinkins
(74) Attorney, Agent, or Firm—Dority & Manning

(57) ABSTRACT

A multi-layer ceramic capacitor (MLC) device for low inductance decoupling applications is provided in which a first terminal is formed around substantially the entire periphery of the device body and a second opposing polarity terminal is formed by a through-via located generally in the middle of the device body. In an alternative embodiment, a plurality of surface mount MLC devices are mounted to a circuit board in a diamond arrangement so as to allow contacts of one polarity to be electrically connected to terminals of similar polarity which are located substantially around the entire periphery of each device body. Contacts of opposing polarity may be electrically connected to through-via terminals located generally in the middle of each device body. In a third embodiment, a single surface mount MLC device is provided in which all electrical connections between the circuit board and the device are made by through-via terminals which align with respective contacts on the circuit board.

10 Claims, 6 Drawing Sheets

LOW INDUCTANCE CHIP WITH CENTER VIA CONTACT

BACKGROUND OF THE INVENTION

This invention generally relates to multi-layer ceramic capacitors (MLCS) adapted to be mounted to the surface of a circuit board. Further, the invention relates to a surface mount MLC device mounted on a circuit board and having a contact arrangement of alternating layers to achieve low inductance. More precisely, the present invention relates to a surface mount MLC device with a terminal arrangement providing low inductance for decoupling applications, such as high-speed microprocessor applications.

Advanced semiconductor circuits, particularly VLSI chips, almost universally employ decoupling capacitors. The decoupling capacitors are generally charged independent of circuit operation and are discharged to deliver a current that enables fast transition circuit switching with minimum noise. Closer physical location of the capacitor to the circuit allows for and is essential for higher switching speeds of the chip. If utilized in this manner, not only is the capacitance of the component important, but additionally, its inductance is crucial to overall performance.

In decoupling today's high speed digital circuits the capacitor is primarily being used to eliminate high-speed transient noise which is above its resonance point. In these applications it is desirable to maintain as low an inductance as possible. When a capacitor is mounted on a board, lead lengths and board lines are a major source of inductance. This inductance must be minimized to obtain good decoupling performance under high-speed transient conditions. The use of multiple capacitors instead of a few large bulk capacitors can be used to reduce inductance and gain more efficient surge-current availability.

While a large number of prior art capacitive devices are known, none is believed to be directly pertinent to low inductance surface mount MLC devices for decoupling applications, such as high-speed microprocessing. Prior art discoidal capacitors with through-holes are shown in references such as U.S. Pat. Nos. 4,148,003, 5,177,633 and 4,247,881. While useful for their purpose, none of the prior art capacitive devices disclose or suggest a surface mount MLC in a generally square configuration for use in low inductance decoupling applications.

It is, therefore, desirable to provide an MLC, generally square-shaped, which exhibits low inductance and is capable of surface mounting on a circuit board for decoupling applications, such as high-speed microprocessing, with a first terminal around substantially the entire periphery of the device and a second opposing polarity terminal located by way of a through-via generally in the center of the device body.

SUMMARY OF THE INVENTION

The present invention recognizes and addresses various of the foregoing limitations and drawbacks, and others, concerning the lack of a surface mount multi-layer ceramic capacitor (MLC) device for low inductance decoupling applications. Therefore, the present invention provides an MLC device, generally square in configuration, for decoupling high frequency transients, in which the device has a first terminal substantially located around the entire periphery of the device and a second opposing polarity terminal located by way of a through-via in generally the middle of the device body.

It is, therefore, a principle object of the subject invention to provide an MLC device. More specifically, it is an object of the present device to provide an MLC device which exhibits a low inherent inductance. Most specifically, it is an object of the present invention to provide an MLC device with low inductance characteristics and a high capacitance/area which is readily adaptable to variation in size and dimension yet simple to manufacture and cost effective.

It is a further object of the present invention to provide a generally square-shaped MLC device. It is still after object to provide a generally square-shaped MLC device with a first terminal located substantially around the entire periphery of the device. It is still a further object of the present invention to provide a generally square-shaped MLC device with a first terminal located substantially around the entire periphery of the device and a second opposing polarity terminal located by way of a through-via in generally the middle of the device body.

It is yet another object of the present invention to provide a single MLC device capable of making connection with numerous contacts located on the circuit board. It is still another object of the present invention to provide a multi-chip array comprised of a plurality of surface mount MLC devices in which the devices are arranged in a diamond pattern for high-speed microprocessor applications.

Additional objects and advantages of the invention are set forth in, or will be apparent to those of ordinary skill in the art from, the detailed description to as follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments, of this invention, may include various combinations or configurations of presently disclosed features, elements, or their equivalents (including combinations of features or configurations thereof not expressly shown in the figures or stated in the detailed description).

These and other features, aspects and advantages of the present invention will become better understood with reference to the following description and appended claims. The accompanying drawings, which are incorporated in and constitute a part of this specification, illustrate an embodiment of the invention and, together with the description, serve to explain the principles of the invention.

In one exemplary embodiment, a square capacitor device is provided having a ceramic body formed from a plurality of ceramic-electrode layers interleaved to form a stack. The stack is pressed and sintered to achieve a substantially unitary capacitor body. A first polarity terminal is located substantially about the entire periphery of the device body. A second polarity terminal is formed by a through-via located generally in the middle of the device body. The through-via may or may not be filled with solder.

In another exemplary embodiment, an array of surface mount MLC devices are mounted on a circuit board for use in low inductance decoupling applications, such as a high-speed microprocessor. The MLC devices are mounted in a diamond arrangement such that contacts of one polarity will be electrically connected to a first terminal located substantially about the entire periphery of the device body on each of such devices with direct electrical connection occurring at the corners of the device body. Contacts of an opposing polarity may be electrically connected to a through-via terminal located generally in the middle of each device body.

In a third embodiment of the present invention, a single surface mount MLC device is provided which makes electrical connection with a plurality of contact points on a circuit board. In this embodiment, all terminals of the device are formed by through-vias which align with respective contacts on the circuit board.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
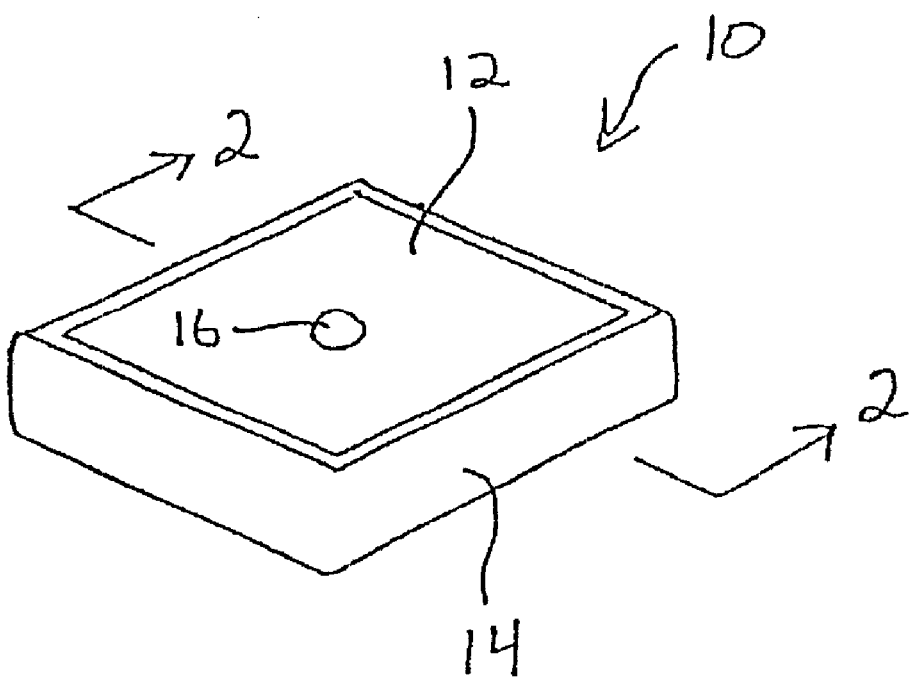
FIG. 1 is an isometric view of one embodiment of an MLC device constructed in accordance with the present invention.

Repeat use of reference characters throughout the present specification and appended drawings is intended to represent the same or analogous features or elements of the invention.

DETAILED DESCRIPTION OF THE PREFERRED EMBODIMENTS

Reference will now be made in detail to presently preferred embodiments of the invention, examples of which are fully represented in the accompanying drawings. Such examples are provided by way of an explanation of the invention, not limitation thereof. In fact, it will be apparent to those skilled in the art that various modifications and variations can be made in the present invention, without departing from the spirit and scope thereof. For instance, features illustrated or described as part of one embodiment can be used on another embodiment to yield a still further embodiment. Still further, variations in selection of materials and/or characteristics may be practiced to satisfy particular desired user criteria. Thus, it is intended that the present invention cover such modifications and variations as come within the scope of the present features and their equivalents.

Figure 2:
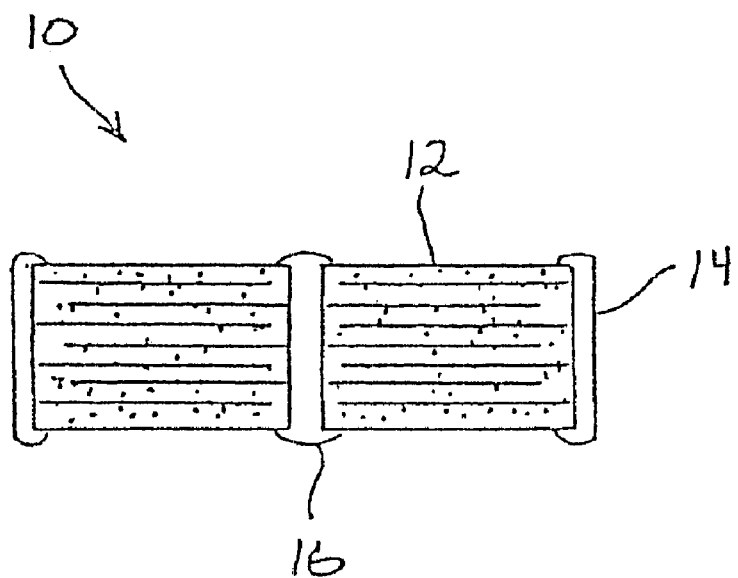
FIG. 2 is a cross-section view of the embodiment of the present invention depicted in FIG. 1 showing the internal arrangement of the capacitor including the terminations.

As disclosed above, the present invention is particularly concerned with a multi-layer ceramic capacitive device for use in low inductance decoupling applications, such as high-speed microprocessing. As shown in FIGS. 1 and 2, one preferred embodiment of the present invention is a generally square-shaped MLC device 10 formed from a plurality of parallel ceramic-electrode layers interleaved to form a stack. The stack may be pressed and sintered to achieve a substantially unitary capacitor body 12. A first polarity terminal 14 is located on all sides of the device body's periphery. A second polarity terminal 16 is formed by a through-via located generally in the middle of the device body 12. The second polarity terminal 16 may or may not be filled with solder (the via is filled with solder in the illustrated embodiment).

Figure 3A:
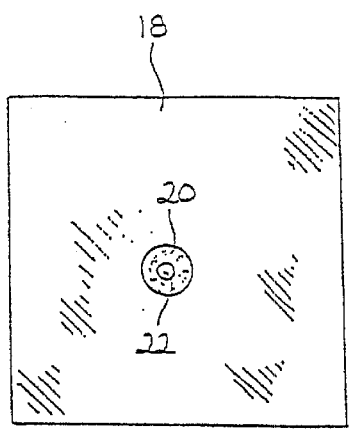
FIGS. 3A and 3B are top views of alternating electrode layers which may be used to form the embodiment of the present invention as depicted in FIGS. 1 and 2.
Figure 3B:
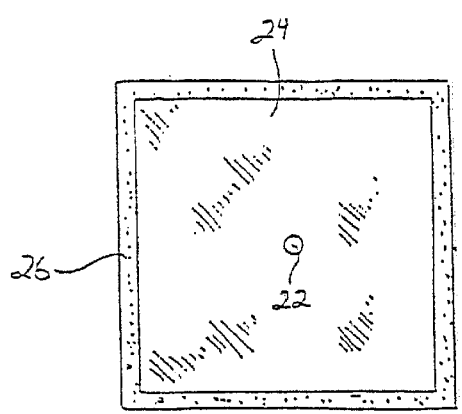

FIGS. 3A and 3B illustrate the two ceramic-electrode layers which are alternatively repeated and interleaved to produce the capacitor body 12. The first ceramic electrode-layer, as shown in FIG. 3A, has a first electrode plate 18 covering substantially the entire underlying electrode sheet. A circular portion 20 of the sheet surrounding via 22 is left uncovered by first electrode plate 18 so as to prevent electrical connection between first electrode plate 18 and terminal 16. Instead, first electrode plate 18 is electrically connected to terminal 14 which extends substantially about the entire periphery of the device body 12.

As seen in FIG. 3B, the second ceramic-electrode layer includes a second electrode plate 24 that extends to via 22 for making electrical connection with terminal 16. A perimeter region 26 of the ceramic sheet is left uncovered by second electrode plate 24 to prevent electrical connection between second electrode plate 24 and terminal 14.

Figure 5:
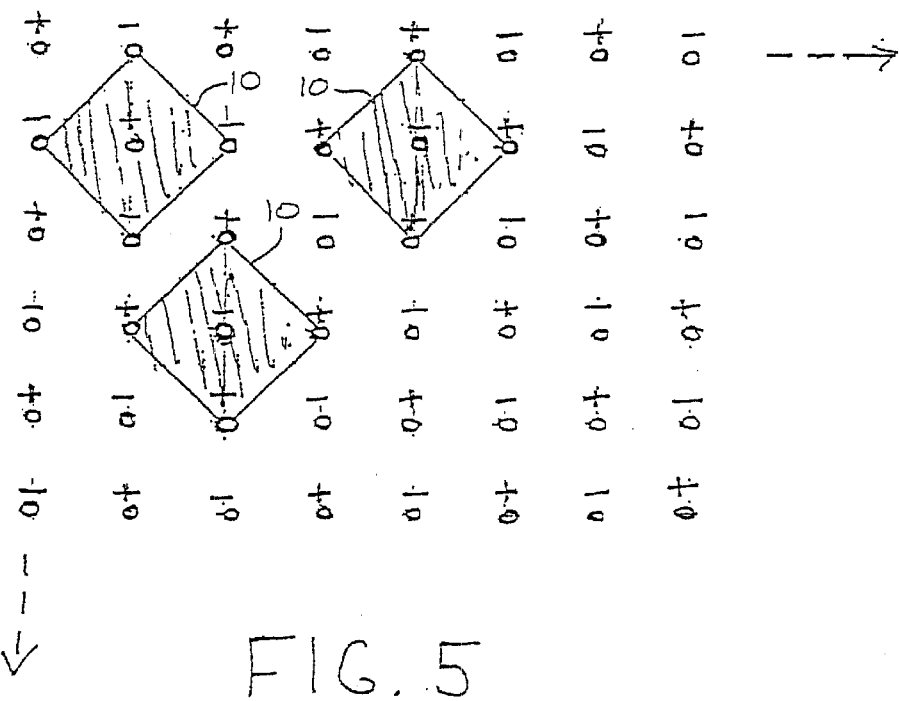
FIG. 5 is an alternative embodiment of the present invention allowing the surface mounting of multiple MLCs for low inductance decoupling applications.

FIG. 5 illustrates an alternative preferred embodiment of the present invention by which an array of surface mount MLC devices may be mounted for use in low inductance decoupling applications. Devices 10 may be mounted in a diamond arrangement such that contacts of one polarity may be electrically connected to terminal 16. Terminal 14 can make connection with four contacts of opposing polarity, one at each corner of the device body 12.

Figure 6:
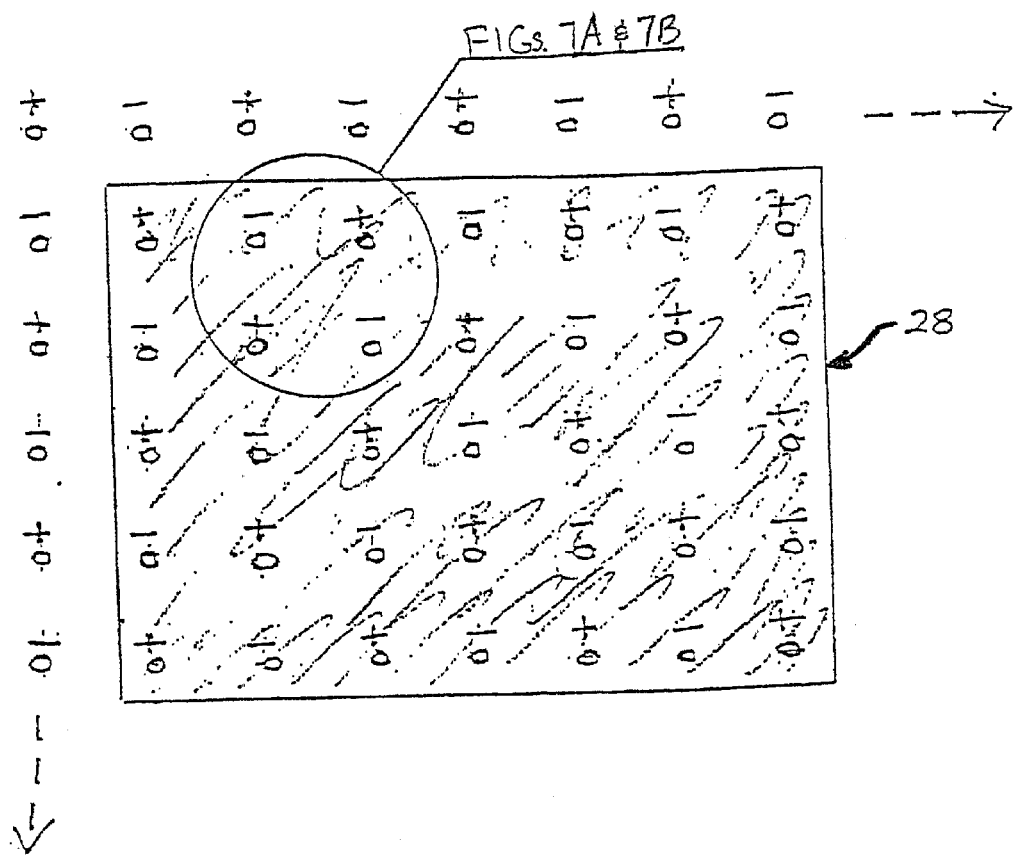
FIG. 6 is a second alternative embodiment of the present invention allowing for a single surface mount MLC to make connection with multiple contacts on the circuit board.

In a third preferred embodiment of the present invention, as seen in FIG. 6, a single MLC capacitive device 28 may make connection with multiple contacts of the circuit board. In this third alternative preferred embodiment, all the terminals of the device 28 are formed by through-vias, which align with respective contacts on the circuit board.

Figure 7A:
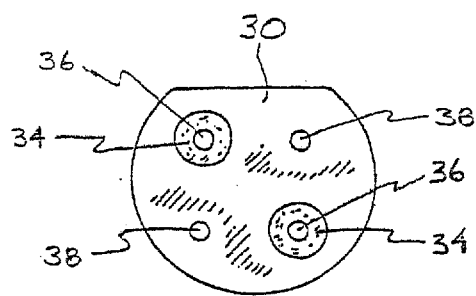
FIGS. 7A and 7B are top views of alternating electrode layers which may be used to form the embodiment of the present invention as depicted in FIG. 6.
Figure 7B:
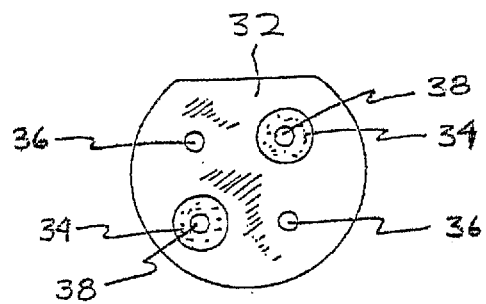

FIGS. 7A and 7B illustrate the two types of ceramic-electrode layers which are alternatively repeated and interleaved to produce the capacitor body 12 of the third alternative preferred embodiment shown in FIG. 6. The first ceramic electrode-layer, as shown in FIG. 7A, has a first electrode plate 30 covering substantially the entire underlying electrode sheet. A circular portion 34 of the sheet surrounding through-via terminals 36 are left uncovered so as to prevent electrical connection between first electrode plate 30 and said through-via terminals 36. Instead, first electrode plate 30 is electrically connected to the alternative through-via terminals 38, all of an opposing polarity.

As seen in FIG. 7B, the second ceramic-electrode layer includes a second electrode plate 32 covering substantially the entire underlying electrode sheet. A circular portion 34 of the sheet surrounding through-via terminals 38 is left uncovered so as to prevent electrical connection between second electrode plate 32 and said through via-terminals 38. Instead, second electrode plate 32 is electrically connected to the alternative through-via terminals 36.

Although a preferred embodiment of the invention has been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged both in whole or in part. Therefore, the spirit and scope of the appended claims should not be limited to the description of the preferred version contained herein.

What is claimed is:

1. A multi-layer ceramic capacitive device comprising:
   a plurality of first electrode plates with a via centrally located therein, said via having a first diameter, wherein said first electrode plates have a circular opening having a second diameter therein and wherein said circular opening surrounds said via;
   a plurality of second electrode plates with a via centrally located therein, said via having said first diameter, wherein said second electrode plates have a perimeter region of said plates removed and wherein said pluralities of first and second electrode plates are respectively interleaved in alternating planes to form a capacitive stack;
   a first terminal surrounding the perimeter of the capacitive stack and in electrical connection with each of said plurality of first electrode plates; and
   a second terminal in said via and in electrical connection with each of said plurality of second electrode plates.

2. A multi-layer ceramic capacitive device as in claim 1, wherein said device is generally square-shaped.

3. A multi-layer ceramic capacitive device as in claim 2, wherein said second terminal is formed by filling said via with solder.

4. A multi-layer ceramic capacitive device as in claim 2, wherein said device is mounted to a substrate such that electrical connection to said first terminal is provided at selected corners of said generally square-shaped device.

5. A multi-layer ceramic capacitive device as in claim 2, wherein said device is mounted to a substrate such that electrical connection to said first terminal is provided at each of the four corners of said generally square-shaped device.

6. A multi-layer ceramic capacitive device as in claim 1, further comprising a portion of solder generally filling said via for providing electrical connection to each of said plurality of second electrode plates.

7. A multi-layer ceramic capacitive array mounted to a circuit board having a plurality of contacts in a plurality of tows, said plurality of contacts within each of said plurality of rows having an alternating pattern of polarity, said array comprising:
   a plurality of multi-layer ceramic capacitive devices wherein each of said devices have a first terminal surrounding the perimeter of said capacitive device and in electrical connection with each of a plurality of first electrode plates and a second terminal centrally located in said capacitive device in a through-via and in electrical connection with each of a plurality of second electrode plates, said first and second electrode plates being interleaved to form said capacitive device;
   wherein said plurality of capacitive devices are mounted to said circuit board in a diamond arrangement such that said first terminal is in electrical connection with four of said plurality of contacts, one each at the corners of the device and wherein said second terminal is in electrical connection with one of said plurality of contacts of an opposing polarity.

8. A multi-layer ceramic capacitive device mounted to a circuit board having a plurality of contacts in a plurality of tows, said plurality of contacts within each of said plurality of rows having an alternating pattern of polarity, said device comprising:
   a plurality of first electrode plates with a plurality of vias located therein;
   a plurality of second electrode plates with a plurality of vias located therein, said pluralities of first and second electrode plates interleaved to form said capacitive device wherein said plurality of vias in said first electrode plates, said plurality of vias in said second electrode plates and said plurality of contacts on said circuit board are aligned;
   a plurality of first terminals corresponding to alternating ones of said plurality of contacts in each of said plurality of rows such that all of said first terminals have the same polarity; and
   a plurality of second terminals corresponding to alternating ones of said plurality of contacts in each of said plurality of rows such that all of said second terminals have the same polarity which opposes the polarity of said first terminals.

9. A multi-layer ceramic capacitive device mounted to a circuit board having a plurality of contacts in a plurality of tows, said plurality of contacts within each of said plurality of rows having an alternating pattern of polarity as in claim 8, wherein said device is generally rectangular.

10. A multi-layer ceramic capacitive device as in claim 8, wherein each of said first terminals is connected to a selected location within each first electrode plate and wherein each of said second terminals is connected to a selected location within each second electrode plate.

* * * * *

UNITED STATES PATENT AND TRADEMARK OFFICE
CERTIFICATE OF CORRECTION

PATENT NO.         : 6,477,032 B2                                          Page 1 of 1
APPLICATION NO.    : 09/775050
DATED              : November 5, 2002
INVENTOR(S)        : Albert S. Makl, Jr.

It is certified that error appears in the above-identified patent and that said Letters Patent is hereby corrected as shown below:

In Column 5, Row 44 (Claim 7), please delete the word "tows" and replace with the word --rows--.

In Column 6, Row 16 (Claim 8), please delete the word "tows" and replace with the word --rows--.

In Column 6, Row 40 (Claim 9), please delete the word "tows" and replace with the word --rows--.

Signed and Sealed this
Twenty-third Day of October, 2012

David J. Kappos
*Director of the United States Patent and Trademark Office*

(12) EX PARTE REEXAMINATION CERTIFICATE (10542nd)
United States Patent
Makl, Jr.

(10) Number: US 6,477,032 C1
(45) Certificate Issued: Mar. 17, 2015

(54) LOW INDUCTNANCE CHIP WITH CENTER VIA CONTACT

(75) Inventor: Albert S. Makl, Jr., Chula Vista, CA (US)

(73) Assignee: AVX Corporation, Myrtle Beach, SC (US)

Reexamination Request:
No. 90/012,091, Jan. 12, 2012

Reexamination Certificate for:
Patent No.: 6,477,032
Issued: Nov. 5, 2002
Appl. No.: 09/775,050
Filed: Jan. 31, 2001

Certificate of Correction issued Oct. 23, 2012

(51) Int. Cl.
H01G 4/228 (2006.01)
H01G 4/30 (2006.01)
H01G 4/232 (2006.01)

(52) U.S. Cl.
CPC . *H01G 4/232* (2013.01); *H01G 4/30* (2013.01)
USPC ............. 361/306.3; 361/321.2; 361/329

(58) Field of Classification Search
None
See application file for complete search history.

(56) References Cited

To view the complete listing of prior art documents cited during the proceeding for Reexamination Control Number 90/012,091, please refer to the USPTO's public Patent Application Information Retrieval (PAIR) system under the Display References tab.

*Primary Examiner* — Yuzhen Ge

(57) ABSTRACT

A multi-layer ceramic capacitor (MLC) device for low inductance decoupling applications is provided in which a first terminal is formed around substantially the entire periphery of the device body and a second opposing polarity terminal is formed by a through-via located generally in the middle of the device body. In an alternative embodiment, a plurality of surface mount MLC devices are mounted to a circuit board in a diamond arrangement so as to allow contacts of one polarity to be electrically connected to terminals of similar polarity which are located substantially around the entire periphery of each device body. Contacts of opposing polarity may be electrically connected to through-via terminals located generally in the middle of each device body. In a third embodiment, a single surface mount MLC device is provided in which all electrical connections between the circuit board and the device are made by through-via terminals which align with respective contacts on the circuit board.

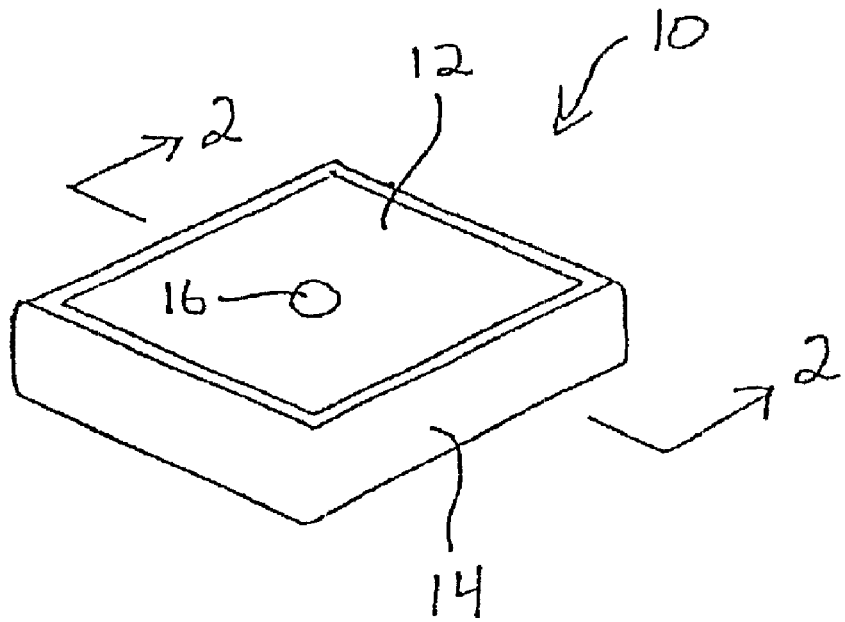

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-6 are cancelled.

New claims 11-16 are added and determined to be patentable.

Claims 7-10 were not reexamined.

11. *A surface mount, multi-layer, ceramic capacitive device comprising:*
   *a plurality of first ceramic-electrode layers with a via centrally located therein, said via having a first diameter, wherein each of said plurality of first ceramic-electrode layers comprises:*
      *a first ceramic layer with said via centrally located therein; and*
      *a first electrode layer overlying said first ceramic layer, wherein:*
         *said first electrode layer has a centrally located circular opening having a second diameter therein;*
         *said circular opening surrounds said via; and*
         *said first electrode layer leaves uncovered an annular portion of said first ceramic layer defined by said first diameter and said second diameter;*
   *a plurality of second ceramic-electrode layers with said via centrally located therein, said via having said first diameter, wherein each of said second ceramic-electrode layers comprises:*
      *a second ceramic layer with said via centrally located therein; and*
      *a second electrode layer with said via centrally located therein overlying said second ceramic layer, wherein said second electrode layer leaves uncovered an outer perimeter portion of said second ceramic layer;*
   *wherein said pluralities of first and second ceramic-electrode layers are respectively interleaved in alternating planes to form a capacitive stack;*
   *a first terminal surrounding the perimeter of the capacitive stack and in electrical connection with each first electrode layer of said plurality of first ceramic-electrode layers;*
   *a second terminal in said via and in electrical connection with each second electrode layer of said plurality of second ceramic-electrode layers; and*
   *wherein said first terminal and said second terminal are configured for electrical connection to a circuit board.*

12. *A surface mount, multi-layer ceramic capacitive device as in claim 11, wherein:*
   *said device is generally square-shaped;*
   *said first terminal is configured for electrical connection to said circuit board at each corner of said generally square-shaped device; and*
   *said second terminal is configured for electrical connection to said circuit board at said centrally located via.*

13. *A surface mount, multi-layer ceramic capacitive device as in claim 12, wherein said second terminal consists essentially of solder filling said via.*

14. *A surface mount, multi-layer ceramic capacitive device as in claim 12, wherein said device is mounted to a circuit board such that electrical connection to said first terminal is provided at selected corners of said generally square-shaped device.*

15. *A surface mount, multi-layer ceramic capacitive device as in claim 12, wherein said device is mounted to a circuit board such that electrical connection to said first terminal is provided at each of the four corners of said generally square-shaped device.*

16. *A surface mount, multi-layer ceramic capacitive device as in claim 11, wherein said second terminal comprises solder completely filling said via and providing electrical connection to each second electrode layer of said plurality of second ceramic-electrode layers.*

\* \* \* \* \*